United States Patent
Ying et al.

(10) Patent No.: US 12,200,471 B2
(45) Date of Patent: Jan. 14, 2025

(54) DATA PROCESSING METHOD AND DATA PROCESSING APPARATUS

(71) Applicant: Huawei Technologies Co., Ltd., Shenzhen (CN)

(72) Inventors: Jiangwei Ying, Beijing (CN); Meng Li, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 17/489,422

(22) Filed: Sep. 29, 2021

(65) Prior Publication Data

US 2022/0030496 A1  Jan. 27, 2022

Related U.S. Application Data

(63) Continuation of application No. PCT/CN2020/081356, filed on Mar. 26, 2020.

(30) Foreign Application Priority Data

Apr. 1, 2019 (CN) .......................... 201910258578.X

(51) Int. Cl.
*H04W 36/32* (2009.01)
*H04W 4/40* (2018.01)
(Continued)

(52) U.S. Cl.
CPC ............. *H04W 36/32* (2013.01); *H04W 4/40* (2018.02); *H04W 28/0268* (2013.01);
(Continued)

(58) Field of Classification Search
CPC ... H04W 36/32; H04W 4/40; H04W 28/0268; H04W 36/30; H04W 40/36; H04W 92/18;
(Continued)

(56) References Cited

U.S. PATENT DOCUMENTS

2017/0288886 A1  10/2017  Atarius et al.
2018/0270782 A1  9/2018  Park et al.
(Continued)

FOREIGN PATENT DOCUMENTS

CN  107347214 A  11/2017
CN  107734545 A  2/2018
(Continued)

OTHER PUBLICATIONS

Qiao Chu "Exploration on End-to-End Slicing Technology of 5G Network," Sichuan Communication Research Planning & Designing Co., Ltd., Communications Technology, vol. 51, No. 9, pp. 2092-2101 (Sep. 2018). With English Abstract.
(Continued)

*Primary Examiner* — Abdullahi Ahmed
(74) *Attorney, Agent, or Firm* — Leydig, Voit & Mayer, Ltd.

(57) ABSTRACT

A data processing method and a data processing apparatus are described that simplify an operation procedure in which an access and mobility management function (AMF) entity delivers a quality of service (QoS) parameter to an access network device to which the terminal device requests to connect or a target access network device to which the terminal device requests to be handed over, and reduce signaling overheads. The described method includes an access and mobility management function AMF entity receiving a quality of service QoS parameter used for a ProSe communication 5 (PC5) interface communication of a terminal device. The AMF entity stores the QoS parameter. When a preset condition is satisfied, the AMF entity sends the stored QoS parameter to a first access network device.

20 Claims, 6 Drawing Sheets

(51) Int. Cl.
  *H04W 28/02* (2009.01)
  *H04W 36/30* (2009.01)
  *H04W 40/36* (2009.01)
  *H04W 92/18* (2009.01)
(52) U.S. Cl.
  CPC ........... *H04W 36/30* (2013.01); *H04W 40/36* (2013.01); *H04W 92/18* (2013.01)
(58) Field of Classification Search
  CPC . H04W 76/14; H04W 24/02; H04W 36/0016; H04W 76/10; H04W 76/30
  See application file for complete search history.

(56) References Cited

U.S. PATENT DOCUMENTS

| | | | |
|---|---|---|---|
| 2018/0324633 A1 | 11/2018 | Lee et al. | |
| 2019/0037636 A1* | 1/2019 | Kim | H04W 76/28 |
| 2020/0205209 A1* | 6/2020 | Pan | H04W 72/51 |
| 2020/0296619 A1* | 9/2020 | Pan | H04W 76/14 |
| 2022/0116814 A1* | 4/2022 | Di Girolamo | H04W 4/027 |
| 2022/0312299 A1* | 9/2022 | Mochizuki | H04W 48/16 |
| 2023/0189393 A1* | 6/2023 | Ying | H04W 4/46 370/311 |

FOREIGN PATENT DOCUMENTS

| | | |
|---|---|---|
| CN | 108401269 A | 8/2018 |
| CN | 108513726 A | 9/2018 |
| CN | 108702722 A | 10/2018 |
| CN | 108809897 A | 11/2018 |
| CN | 109041138 A | 12/2018 |
| RU | 2682909 C1 | 3/2019 |
| WO | 2016013826 A1 | 1/2016 |
| WO | 2016078684 A1 | 5/2016 |
| WO | 2018016157 A1 | 1/2018 |
| WO | 2018196497 A1 | 11/2018 |

OTHER PUBLICATIONS

"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.0.0, pp. 1-118, 3rd Generation Partnership Project, Valbonne, France (Mar. 2019).

"3rd Generation Partnership Project; Technical Specification Group Services and System Aspects; Architecture enhancements for 5G System (5GS) to support Vehicle-to-Everything (V2X) services (Release 16)," 3GPP TS 23.287 V0.2.0, pp. 1-29, 3rd Generation Partnership Project, Valbonne, France (Mar. 2019).

"Procedure modification in 5GC for V2X," SA WG2 Meeting #S2-131, S2-1902935 (email revision 4 of S2-1902614), Santa Cruz—Tenerife, Total 3 pages, 3rd Generation Partnership Project, Valbonne, France (Feb. 25-Mar. 1, 2019).

"KI#14: Update of Solution 19 and conclusion," SA WG2 Meeting #129bis, S2-1812858 (revision of S2-1812387), West Palm Beach, FL, USA, pp. 1-4, 3rd Generation Partnership Project, Valbonne, France (Nov. 26-30, 2018).

"3rd Generation Partnership Project; Technical Specification Group Services and System Aspects; Procedures for the 5G System; Stage 2 (Release 16)," 3GPP TS 23.502, V16.0.0, pp. 1-420, 3rd Generation Partnership Project, Valbonne, France (Mar. 2019).

"3rd Generation Partnership Project; Technical Specification Group Radio Access Network; NG-RAN; NG Application Protocol (NGAP)(Release 15)," 3GPP TS 38.413 V15.2.0, total 308 pages, 3rd Generation Partnership Project, Valbonne, France (Dec. 2018).

"Solution for Key Issue#4 and Key Issue#7 for PC5 based V2X message transmission," 3GPP TSG-SA2 Meeting #114, Sophia Antipolis, S2-161527, Total 4 pages. 3rd Generation Partnership Project, Valbonne, France (Apr. 11-15, 2016).

* cited by examiner

DATA PROCESSING METHOD AND DATA PROCESSING APPARATUS

CROSS-REFERENCE TO RELATED APPLICATIONS

This application is a continuation of International Application No. PCT/CN2020/081356, filed on Mar. 26, 2020, which claims priority to Chinese Patent Application No. 201910258578.X, filed on Apr. 1, 2019. The disclosures of the aforementioned applications are hereby incorporated by reference in their entireties.

TECHNICAL FIELD

This application relates to the field of communications technologies, and in particular, to a data processing method and a data processing apparatus.

BACKGROUND

A vehicle-to-everything (V2X) wireless communications technology is a next-generation information and communications technology that connects vehicles to everything. V represents vehicles, and X represents any object that exchanges information with vehicles, for example, a vehicle, a person, roadside infrastructure, or a network. The V2X wireless communications technology uses two types of communications interfaces: one is a direct communications interface between a vehicle, a person, and a road, for example, a ProSe communication 5 (PC5) interface, which may be used for short-distance communication between a vehicle, a person, and a road; and the other one is a communications interface between a terminal and a base station, for example, a direct radio interface between a universal terrestrial radio access network (UTRAN) and user equipment (the radio interface between UTRAN and the user equipment, Uu), which may implement reliable communication over a long distance within a larger range.

Currently, in a V2X wireless communications system based on a 5G communications technology, a policy control function (PCF) entity sends, to an access network device, a quality of service (QoS) parameter used for PC5 interface communication. The QoS parameter may be used for PC5 interface communication between a plurality of (two or more) terminal devices. A specific process is as follows: When the terminal device requests to establish a connection to a network, an access and mobility management function (AMF) entity sets up an N11 interface connection to the PCF entity for the terminal device; the AMF entity requests the QoS parameter from the PCF entity; and then the PCF entity sends the QoS parameter to the AMF entity by using the N11 interface connection, and the AMF entity sends the QoS parameter to the access network device.

In the foregoing solution, there are a plurality of scenarios in which the terminal device requests to establish a connection to the network. For example, the terminal device is in an idle state and requests to establish a connection to the network again, or the terminal device is in a connected state and requests to be handed over from a source access network device to a target access network device. Because the foregoing actions are performed in the plurality of scenarios, an operation procedure is complex, and signaling overheads are relatively high.

SUMMARY

Embodiments of this application provide a data processing method and a data processing apparatus, to simplify an operation procedure in which an AMF entity delivers a QoS parameter to an access network device to which a terminal device requests to connect or a target access network device to which the terminal device requests to be handed over, and reduce signaling overheads.

A first aspect of the embodiments of this application provides a data processing method, including:

An AMF entity receives a QoS parameter used for PC5 interface communication of a terminal device. Then the AMF entity stores the QoS parameter. When a preset condition is satisfied, the AMF entity sends the QoS parameter to a first access network device. Therefore, when the terminal device is in an idle state and requests to establish a connection to the first access network device, or when the terminal device is in a connected state and requests to be handed over from a current access network device to the first access network device, the AMF entity does not need to request the QoS parameter from a PCF entity again. Instead, the AMF entity delivers the QoS parameter stored by the AMF entity to the access network device to which the terminal device requests to connect or be handed over. In this way, an operation procedure is simplified and signaling overheads are reduced.

In a possible implementation of the first aspect, that an AMF entity receives a QoS parameter used for PC5 interface communication of a terminal device includes: The AMF entity receives the QoS parameter through an N2 interface.

In another possible implementation of the first aspect, that an AMF entity receives a QoS parameter used for PC5 interface communication of a terminal device includes: The AMF entity receives N2 interface information, where the N2 interface information includes the QoS parameter. That the AMF entity stores the QoS parameter includes: The AMF entity stores the N2 interface information.

In another possible implementation of the first aspect, that the AMF entity sends the QoS parameter to the first access network device includes: The AMF entity sends the QoS parameter to the first access network device through an N2 interface; or the AMF entity sends N2 interface information to the first access network device, where the N2 interface information includes the QoS parameter.

In another possible implementation of the first aspect, the preset condition includes: the terminal device is in an idle state, and the AMF entity receives an N2 interface signaling connection setup request from the first access network device, where the N2 interface signaling connection setup request requests to establish an N2 interface signaling connection for the terminal device. In this possible implementation, when the terminal device reestablishes a connection to a network after disconnecting a signaling connection to the network, the AMF entity sends the QoS parameter to the first access network device to which the terminal device requests to connect. A specific scenario in which the AMF entity is triggered to send the QoS parameter to the first access network device is provided.

In another possible implementation of the first aspect, the first access network device is a target access network device of the terminal device; and the preset condition includes: the terminal device is in a connected state, and the AMF entity receives a handover request (handover required) message from a source access network device, where the handover request message requests to hand over the terminal device from the source access network device to the target access network device; the terminal device is in a connected state, and the AMF entity receives a path switch request message from the target access network device, where the path switch request message requests to hand over the terminal device from a source access network device to the target access network device, or the path switch request message requests to switch an N2 signaling connection and an N3 data plane path of the terminal device from a source access network device to the target access network device; or the terminal device is in a connected state, and the terminal device is successfully handed over from a source access network device of the terminal device to the target access network device. In this possible implementation, a plurality of specific scenarios in which the AMF entity is triggered to send the QoS parameter to the first access network device are provided.

In another possible implementation of the first aspect, that an AMF entity receives a QoS parameter used for PC5 interface communication of a terminal device includes: The AMF entity receives N2 interface information from a PCF entity for V2X communication, where the N2 interface information includes the QoS parameter. That the AMF entity stores the QoS parameter includes: When the AMF entity determines that the N2 interface information is from the PCF entity for V2X communication, the AMF entity stores the N2 interface information. In this possible implementation, when the AMF entity receives the QoS parameter from the PCF entity for V2X communication, the AMF entity stores the QoS parameter.

In another possible implementation of the first aspect, before that the AMF entity receives N2 interface information from a PCF entity for V2X communication, the method further includes: The AMF entity selects, for the terminal device based on subscription information of the terminal device, the PCF entity for V2X communication. In this possible implementation, the AMF entity selects, for the terminal device, the PCF entity for V2X communication, so that when the AMF entity subsequently receives the QoS parameter sent by the PCF entity for V2X communication, the AMF entity stores the QoS parameter.

In another possible implementation of the first aspect, that an AMF entity receives a QoS parameter used for PC5 interface communication of a terminal device includes: The AMF entity receives N2 interface information and indication information from a PCF entity, where the N2 interface information includes the QoS parameter, and the indication information indicates the AMF entity to store the N2 interface information, or the indication information is used by the AMF entity to store the QoS parameter. That the AMF entity stores the QoS parameter includes: The AMF entity stores the QoS parameter based on the indication information. In this possible implementation, the AMF entity stores the QoS parameter based on the indication information sent by the PCF entity.

In another possible implementation of the first aspect, that an AMF entity receives a QoS parameter which is used for PC5 interface communication of a terminal device includes: The AMF entity receives N2 interface information from a PCF entity, where the N2 interface information includes the QoS parameter and indication information used to indicate the AMF entity to store the N2 interface information, and optionally, the indication information is used by the AMF entity to store the QoS parameter. That the AMF entity stores the QoS parameter includes: The AMF entity stores the QoS parameter based on the indication information. In this possible implementation, the AMF entity stores the QoS parameter based on the indication information carried in the N2 interface information sent by the PCF entity.

In another possible implementation of the first aspect, that an AMF entity receives a QoS parameter which is used for PC5 interface communication of a terminal device includes: The AMF entity receives the QoS parameter from a second access network device, where the second access network device is the first access network device, or an access network device that serves the terminal device before the first access network device serves the terminal device. In this possible implementation, when the AMF entity receives the QoS parameter from the second access network device, the AMF entity stores the QoS parameter.

In another possible implementation of the first aspect, before that the AMF entity receives the QoS parameter from a second access network device, the method further includes: The AMF entity sends a context release command to the second access network device. That the AMF entity receives the QoS parameter from a second access network device includes: The AMF entity receives a context release complete message from the second access network device, where the context release complete message carries the QoS parameter. In this possible implementation, a specific scenario in which the second access network device sends the QoS parameter to the AMF entity is provided. To be specific, in a release process of the terminal device, the second access network device sends the QoS parameter to the AMF entity by using the context release complete message.

In another possible implementation of the first aspect, the indication information is further used to indicate the AMF entity to send, when the preset condition is satisfied, the QoS parameter to an access network device to which the terminal device requests to connect or the target access network device to which the terminal device requests to be handed over.

A second aspect of the embodiments of this application provides a data processing method, including:

A PCF entity obtains a QoS parameter used for PC5 interface communication of a terminal device, where the QoS parameter is notified to an access network device, and the QoS parameter is used for PC5 interface communication of the terminal device. Then the PCF entity sends N2 interface information and indication information to an AMF entity, where the N2 interface information includes the QoS parameter, and the indication information indicates the AMF entity to store the QoS parameter, or the indication information indicates the AMF entity to store the N2 interface information. In this embodiment, the AMF entity stores the N2 interface information or the QoS parameter by using the indication information delivered by the PCF entity.

In a possible implementation of the second aspect, the indication information is further used to indicate the AMF entity to send, when a preset condition is satisfied, the QoS parameter to an access network device to which the terminal device requests to connect or a target access network device to which the terminal device requests to be handed over.

A third aspect of the embodiments of this application provides a data processing method, including:

A PCF entity obtains a QoS parameter used for a PC5 interface communication of terminal device, where the QoS parameter is notified to an access network device, and the QoS parameter is used for PC5 interface communication of the terminal device. Then the PCF entity sends N2 interface information to an AMF entity, where the N2 interface information includes the QoS parameter and indication information for indicating the AMF entity to store the N2 interface information, and optionally, the indication information is used by the AMF entity to store the QoS parameter. In this embodiment, the indication information sent by the PCF entity indicates the AMF entity to store the N2 interface information or the QoS parameter.

In a possible implementation of the third aspect, the indication information is further used to indicate the AMF entity to send, when a preset condition is satisfied, the QoS parameter to an access network device to which the terminal device requests to connect or a target access network device to which the terminal device requests to be handed over.

A fourth aspect of the embodiments of this application provides a data processing method, including:

In a V2X communication network based on 5G, an access network device receives N2 interface information from a PCF entity, where the N2 interface information includes a QoS parameter used for PC5 interface communication of a terminal device, and the QoS parameter is notified to the access network device, and the QoS parameter is used for PC5 interface communication of the terminal device. Then the access network device sends the QoS parameter to an AMF entity. In this embodiment, the access network device sends the QoS parameter to the AMF entity. When the AMF entity receives the QoS parameter sent by the access network device, the AMF entity stores the QoS parameter, thereby implementing storage of the QoS parameter.

In a possible implementation of the fourth aspect, after that the access network device receives N2 interface information from the PCF entity, and before that the access network device sends the QoS parameter to the AMF entity, the method further includes: The access network device receives a context release command of the AMF entity. Then the access network device releases a context of the terminal device based on the context release command. That the access network device sends the QoS parameter to an AMF entity includes: The access network device sends a context release complete message to the AMF entity, where the context release complete message carries the QoS parameter, and the context release complete message is used by the AMF entity to store the QoS parameter. In this possible implementation, in a release process of the terminal device, the access network device sends the QoS parameter to the AMF entity by using the context release complete message.

A fifth aspect of the embodiments of this application provides a data processing apparatus. The data processing apparatus has a function of implementing a behavior of the AMF entity in the first aspect. The function may be implemented by hardware, or may be implemented by hardware by executing corresponding software. The hardware or the software includes one or more modules corresponding to the foregoing function.

A sixth aspect of the embodiments of this application provides another data processing apparatus. The data processing apparatus has a function of implementing a behavior of the PCF entity in the second aspect. The function may be implemented by hardware, or may be implemented by hardware by executing corresponding software. The hardware or the software includes one or more modules corresponding to the foregoing function.

A seventh aspect of the embodiments of this application provides another data processing apparatus. The data processing apparatus has a function of implementing a behavior of the PCF entity in the third aspect. The function may be implemented by hardware, or may be implemented by hardware by executing corresponding software. The hardware or the software includes one or more modules corresponding to the foregoing function.

An eighth aspect of the embodiments of this application provides another data processing apparatus. The data processing apparatus has a function of implementing a behavior of the access network device in the fourth aspect. The function may be implemented by hardware, or may be implemented by hardware by executing corresponding software. The hardware or the software includes one or more modules corresponding to the foregoing function.

A ninth aspect of the embodiments of this application provides a data processing apparatus. The data processing apparatus includes a processor, a memory, an input/output device, and a bus. The memory stores computer instructions; and when executing the computer instructions in the memory, the processor is configured to implement any one of the implementations of the first aspect.

In a possible implementation of the ninth aspect, the processor, the memory, and the input/output device are separately connected to the bus.

A tenth aspect of the embodiments of this application provides a data processing apparatus. The data processing apparatus includes a processor, a memory, an input/output device, and a bus. The memory stores computer instructions; when the processor executes the computer instructions in the memory, the memory stores the computer instructions; and when executing the computer instructions in the memory, the processor is configured to implement any one of the implementations of the second aspect.

In a possible implementation of the tenth aspect, the processor, the memory, and the input/output device are separately connected to the bus.

An eleventh aspect of the embodiments of this application provides a data processing apparatus. The data processing apparatus includes a processor, a memory, an input/output device, and a bus. The memory stores computer instructions; when the processor executes the computer instructions in the memory, the memory stores the computer instructions; and when executing the computer instructions in the memory, the processor is configured to implement any one of the implementations of the third aspect.

In a possible implementation of the eleventh aspect, the processor, the memory, and the input/output device are separately connected to the bus.

A twelfth aspect of the embodiments of this application provides a data processing apparatus. The data processing apparatus includes a processor, a memory, an input/output device, and a bus. The memory stores computer instructions; when the processor executes the computer instructions in the memory, the memory stores the computer instructions; and when executing the computer instructions in the memory, the processor is configured to implement any one of the implementations of the fourth aspect.

In a possible implementation of the twelfth aspect, the processor, the memory, and the input/output device are separately connected to the bus.

A thirteenth aspect of the embodiments of this application provides a chip system. The chip system includes a processor, configured to support a network device in implementing a related function in the first aspect, for example, sending or processing related data and/or information in the foregoing method. In a possible design, the chip system further includes a memory. The memory is configured to store program instructions and data that are necessary for the network device. The chip system may include a chip, or may include a chip and another discrete component.

A fourteenth aspect of the embodiments of this application provides a chip system. The chip system includes a processor, configured to support a network device in implementing a related function in the second aspect, for example, sending or processing related data and/or information in the foregoing method. In a possible design, the chip system further includes a memory. The memory is configured to store program instructions and data that are necessary for the network device. The chip system may include a chip, or may include a chip and another discrete component.

A fifteenth aspect of the embodiments of this application provides a chip system. The chip system includes a processor, configured to support a network device in implementing a related function in the third aspect, for example, sending or processing related data and/or information in the foregoing method. In a possible design, the chip system further includes a memory. The memory is configured to store program instructions and data that are necessary for the network device. The chip system may include a chip, or may include a chip and another discrete component.

A sixteenth aspect of the embodiments of this application provides a chip system. The chip system includes a processor, configured to support a network device in implementing a related function in the fourth aspect, for example, sending or processing related data and/or information in the foregoing method. In a possible design, the chip system further includes a memory. The memory is configured to store program instructions and data that are necessary for the network device. The chip system may include a chip, or may include a chip and another discrete component.

A seventeenth aspect of the embodiments of this application provides a data processing system, including the data processing apparatus according to the fifth aspect, the data processing apparatus according to the fifth aspect or the sixth aspect, and the data processing apparatus according to the seventh aspect.

An eighteenth aspect of the embodiments of this application provides a computer program product including instructions. When the computer program product runs on a computer, the computer is enabled to perform any one of the implementations of the first aspect, the second aspect, the third aspect, or the fourth aspect.

A nineteenth aspect of the embodiments of this application provides a computer-readable storage medium, including instructions. When the instructions are run on a computer, the computer is enabled to perform any one of the implementations of the first aspect, the second aspect, the third aspect, or the fourth aspect.

It is learned from the foregoing technical solutions that, the embodiments of this application have the following advantages:

The AMF entity receives the QoS parameter used for PC5 interface communication of the terminal device. Then the AMF entity stores the QoS parameter. When the preset condition is satisfied, the AMF entity sends the QoS parameter to the first access network device. Therefore, when the terminal device is in the idle state and requests to establish a connection to the first access network device, or when the terminal device is in the connected state and requests to be handed over from the current access network device to the first access network device, the AMF entity does not need to request the QoS parameter from the PCF entity again. Instead, the AMF entity delivers the QoS parameter stored by the AMF entity to the first access network device. In this way, the operation procedure is simplified and the signaling overheads are reduced.

DESCRIPTION OF EMBODIMENTS

Embodiments of this application provide a data processing method and a data processing apparatus, to simplify an operation procedure in which an AMF entity delivers a QoS parameter to an access network device to which the terminal device requests to connect or a target access network device to which the terminal device requests to be handed over, and reduce signaling overheads.

Figure 1A:
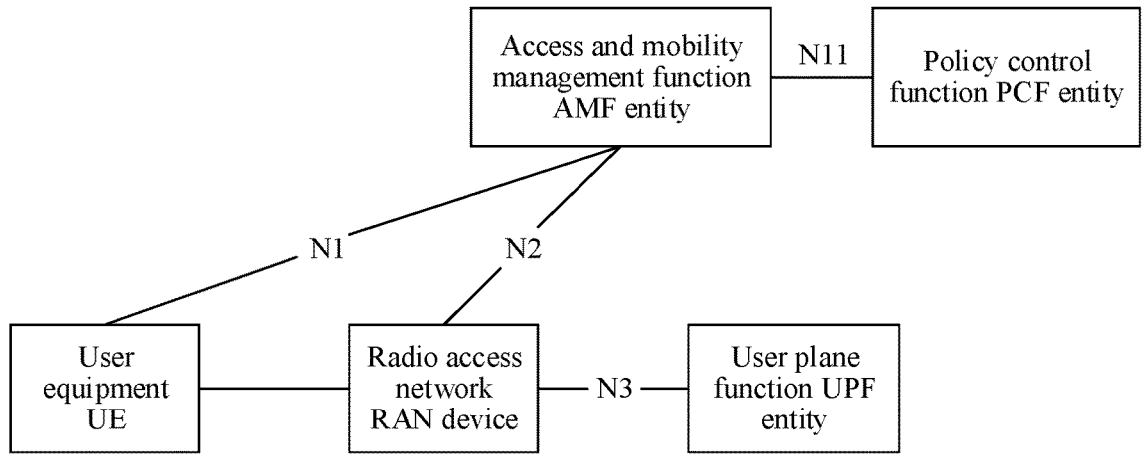
FIG. 1A is a schematic structural diagram of a 3rd generation partnership program network based on a 5G communications technology according to an embodiment of this application.

FIG. 1A is a schematic structural diagram of a 3rd generation partnership project (3GPP) network based on a 5G communications technology. The network shown in FIG. 1A mainly includes a radio access network (RAN) device, an AMF entity, a user plane function (UPF) entity, a PCF entity, a terminal device, and the like.

A RAN may be a network including a plurality of RAN devices, and implement a radio physical layer function, resource scheduling and radio resource management, radio access control, a mobility management function, and the like. The RAN device is connected to the UPF entity through a user plane interface N3, and is configured to transmit data of the terminal device. The RAN device sets up a control plane signaling connection to the AMF entity through a control plane interface N2, to implement a function such as radio access bearer control.

The AMF entity is mainly responsible for functions such as terminal device authentication, terminal device mobility management, network slice selection, and session management function (SMF) entity selection.

The PCF entity is mainly responsible for providing a policy rule to a network entity.

The terminal device is also referred to as user equipment (UE), a mobile station (MS), a mobile terminal (MT), or the like, and is a device that provides voice/data connectivity for a user, for example, a handheld device or a vehicle-mounted device that has a wireless connection function.

The UPF entity serves as an anchor point of a protocol data unit (PDU) session connection, and is responsible for data packet filtering, data transmission/forwarding, rate control, charging information generation, and the like of user equipment.

Figure 1B:
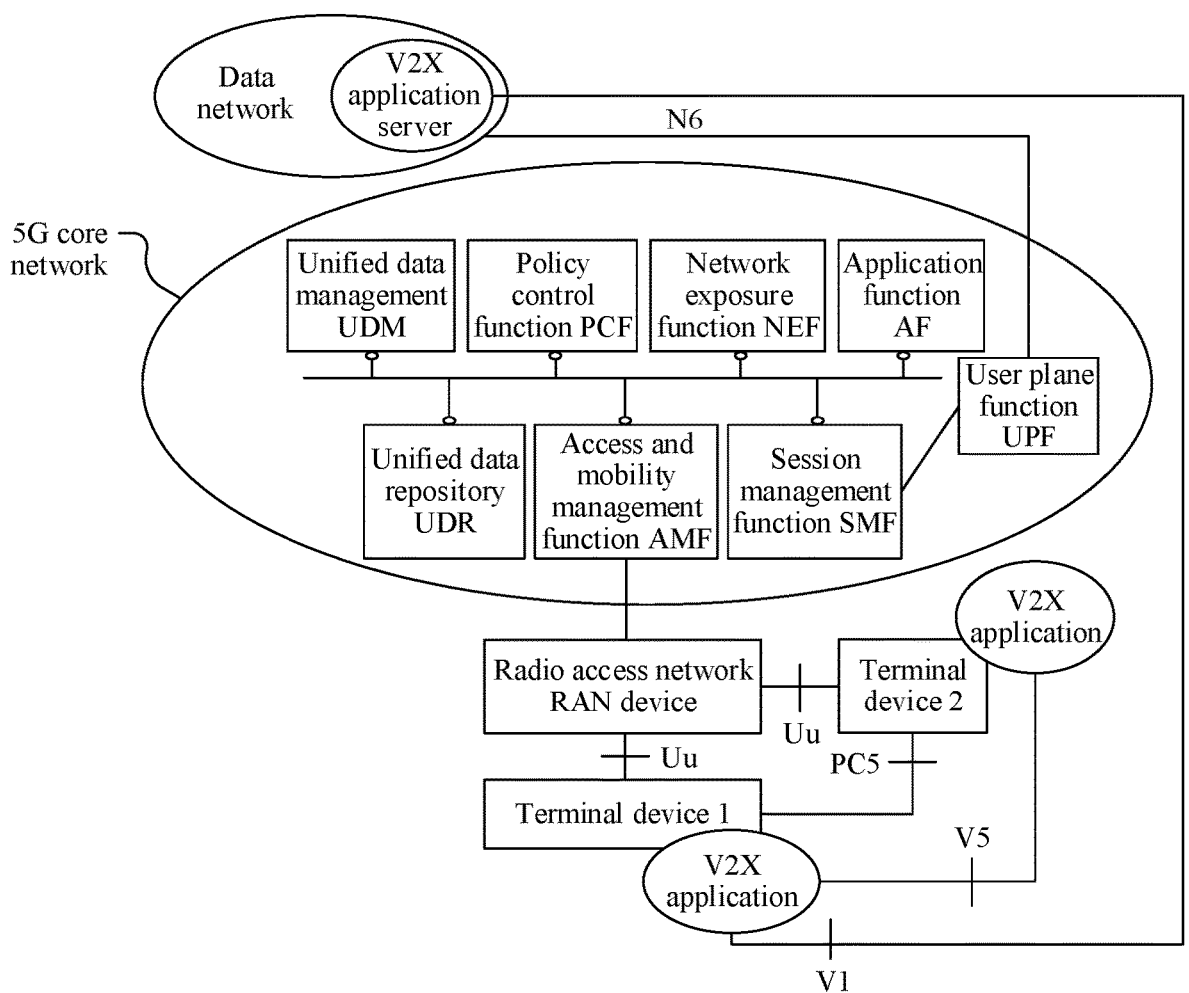
FIG. 1B is a system architectural diagram of a data processing method according to an embodiment of this application.

The following describes a system architectural diagram of the embodiments of this application based on FIG. 1B.

FIG. 1B is a system architectural diagram of a V2X network based on a 5G communications technology. The network shown in FIG. 1B includes two communications interfaces: a PC5 interface and a Uu interface. A terminal device 1 communicates with a terminal device 2 through the PC5 interface. The terminal device 2 communicates with a RAN device through the Uu interface.

In addition, as shown in FIG. 1B, a 5G core network mainly includes a PCF entity, an AMF entity, an SMF entity, a UPF entity, a unified data management (UDM) network element, a unified data repository (UDR) network element, a network exposure function (NEF) network element, and an application function (AF) entity.

The UDM network element mainly manages and controls user data, for example, manages subscription information, which may include: obtaining the subscription information from the UDR network element and providing the subscription information for another network element (e.g., the AMF entity), generating a 3GPP authentication credential for the terminal device, and registering and maintaining a network element currently serving the terminal device.

The UDR network element is mainly configured to store user data. The user data may include subscription data invoked by the UDM network element, policy information invoked by the PCF entity, structured data used for capability exposure, and application data invoked by the NEF network element.

The NEF network element is used for connection and interaction between another internal network element of the core network and an external application server of the core network, to provide network capability information to the external application server, or provide information about the external application server to a core network element.

The AF entity has an application service function, and interacts with the core network element, to serve the terminal device, for example, interacts with the PCF entity to perform service policy control, or interacts with the NEF network element to obtain network capability information or provide application information to the network, or interacts with the PCF entity to provide data network access point information to the PCF entity, so that the PCF entity generates routing information of a corresponding data service.

It should be noted that a data processing method in the embodiments of this application may be applied to the communications network shown in FIG. 1A or FIG. 1B, may be applied to a 3G or 4G communications network, or may be applied to a future communications network, for example, a 6G network or a 7G network. In addition, names of the foregoing involved network elements are not limited, and may be replaced with names of network elements that have same or similar functions in a future communications network. This is not limited in this application.

Figure 2:
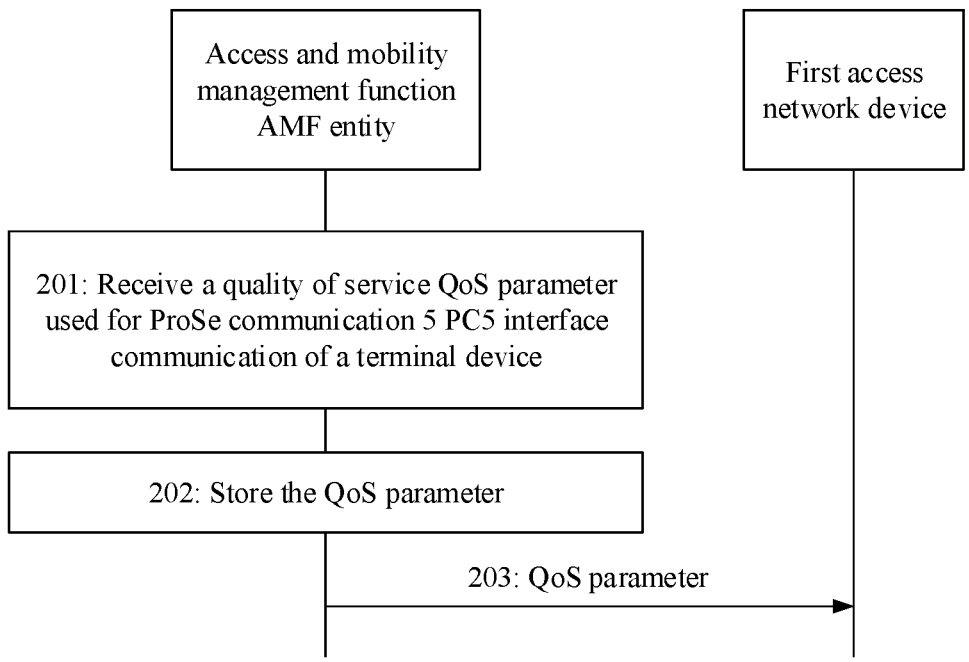
FIG. 2 is a schematic diagram of an embodiment of a data processing method according to an embodiment of this application.

FIG. 2 is a schematic diagram of a data processing method according to an embodiment of this application. As shown in FIG. 2, the method includes the following steps.

201: An AMF entity receives a QoS parameter used for PC5 interface communication of a terminal device.

The QoS parameter is used for PC5 interface communication of the terminal device.

The PC5 interface communication may be communication performed by a plurality of (two or more) terminal devices through a PC5 interface.

Specifically, the AMF entity may receive the QoS parameter in the following manners:

First manner: The AMF entity receives the QoS parameter from a PCF entity.

The PCF entity may be a PCF entity for V2X communication. The foregoing method may further include: The AMF entity selects, for the terminal device based on subscription information of the terminal device, the PCF entity for V2X communication.

Second manner: The AMF entity receives the QoS parameter from an access network device.

The access network device may be an access network device to which the terminal device is currently connected, or an access network device that serves the terminal device before the access network device to which the terminal device is currently connected serves the terminal device.

202: The AMF entity stores the QoS parameter.

For example, the AMF entity receives the QoS parameter through an N2 interface, and then the AMF entity directly stores the QoS parameter. Alternatively, the AMF entity receives N2 interface information, where the N2 interface information includes the QoS parameter; and the AMF entity stores the N2 interface information. This is not limited in this application.

203: When a preset condition is satisfied, the AMF entity sends the QoS parameter to a first access network device.

The first access network device may be an access network device to which the terminal device requests to connect or a target access network device to which the terminal device requests to be handed over. The AMF entity may directly send the QoS parameter to the first access network device through the N2 interface, or may send the N2 interface information to the first access network device, where the N2 interface information includes the QoS parameter. This is not specifically limited herein.

There may be a plurality of preset conditions. The following uses examples to describe the preset conditions.

1. The terminal device is in an idle state, and the AMF entity receives an N2 interface signaling connection setup request from the first access network device.

The N2 interface signaling connection setup request may be used to request to establish an N2 interface signaling connection for the terminal device.

For example, the terminal device is in the idle state, and the terminal device sends a service request message or a registration request message to the AMF entity through a RAN device. In a possible implementation, the service request message or the registration request message is included in a radio resource control connection setup complete message. The terminal device sends the radio resource control connection setup complete message to the RAN device. Then the RAN device sends an initial message of the terminal device to the AMF entity, where the initial message includes the service request message or the registration request message. In this case, the AMF entity sends an initial context setup request to the RAN device, where the context setup request includes the QoS parameter used for PC5 interface communication of the terminal device.

For example, when the terminal device requests to establish a connection to a network, the AMF entity sends the QoS parameter to the first access network device to which the terminal device requests to connect. To enable the AMF entity to directly send the QoS parameter locally stored by the AMF entity to the first access network device, when the AMF entity receives the N2 interface signaling connection setup request from the first access network device, the AMF entity sends the QoS parameter to the first access network device.

It should be noted that, if an access network device to which the terminal device is connected is still a source access network device when the terminal device request to establish a connection to the network, the source access network device and the first access network device may be a same access network device. The source access network device may be an access network device that serves the terminal device before the terminal device is connected to the first access network device. That is, the terminal device only disconnects the connection to the first access network device, and then reestablishes a connection to the first access network device. If the terminal device requests to establish a connection to the network, the connected access network device is the first access network device, that is, the first access network device to which the terminal device is currently connected and the source access network device are not a same access network device. Specifically, an actual connection status of the terminal device is used as a reference. This application is applicable to all the foregoing connection scenarios. This is not specifically limited.

2. The terminal device is in a connected state, and the AMF entity receives a handover request message of the terminal device from a source access network device, where the handover request message requests to hand over the terminal device from the source access network device to the target access network device.

The first access network device may be the target access network device of the terminal device, and the source access network device may be an access network device to which the terminal device is currently connected.

For example, when the terminal device is in the connected state, and the terminal device is handed over from the source access network device to the target access network device, the source access network device sends the handover request message to the AMF entity. To enable the AMF entity to directly send the QoS parameter stored by the AMF entity to the target access network device, when the AMF entity receives the handover request message of the terminal device from the source access network device, the AMF entity sends the QoS parameter to the target access network device.

3. The terminal device is in a connected state, and the AMF entity receives a path switch request message from the target access network device.

The path switch request message may be used to request to hand over the terminal device from a source access network device to the target access network device, or the path switch request message may be used to request to switch an N2 signaling connection and an N3 data plane path of the terminal device from a source access network device to the target access network device.

The first access network device may be the target access network device of the terminal device.

For example, when the terminal device is in the connected state, and the terminal device is handed over to the target access network device, the target access network device sends the path switch request message to the AMF entity. To enable the AMF entity to directly send the QoS parameter stored by the AMF entity to the target access network device, when the AMF entity receives the path switch request message of the terminal device from the target access network device, the AMF entity sends the QoS parameter to the target access network device.

4. The terminal device is in a connected state, and the terminal device is successfully handed over from a source access network device of the terminal device to the target access network device.

For example, for an N2 handover, when the AMF entity receives a handover complete message from the first access network device, the AMF entity sends the QoS parameter to the first access network device, where the handover complete message indicates that the terminal device is successfully handed over from the source access network device to the first access network device, and the first access network device is the target access network device to which the terminal device is handed over. For an Xn interface handover, when the AMF entity sends a path switch request response message to the first access network device, the AMF entity sends the QoS parameter to the first access network device by using N2 signaling, where the path switch request response message indicates that the Xn interface handover is completed. In an optional manner, the N2 signaling may be a context modification request of the terminal device, and the first access network device is the target access network device to which the terminal device is handed over.

In this embodiment of this application, the AMF entity receives the QoS parameter used for PC5 interface communication of the terminal device, where the QoS parameter is notified to an access network device, and the QoS parameter is used for PC5 interface communication of the terminal device; and then the AMF entity stores the QoS parameter. When the preset condition is satisfied, the AMF entity sends the QoS parameter to the first access network device. Therefore, when the terminal device is in the idle state and requests to establish a connection to the first access network device, or when the terminal device is in the connected state and requests to be handed over from a current access network device to the first access network device, the AMF entity does not need to request the QoS parameter from the PCF entity again. Instead, the AMF entity delivers the QoS parameter stored by the AMF entity to the first access network device. In this way, an operation procedure is simplified and signaling overheads are reduced.

Based on the examples of the manners in step 201 in FIG. 2, the AMF entity may receive, in the first manner or the second manner, the QoS parameter used for PC5 interface communication of the terminal device. To enable the AMF entity to store the QoS parameter after the AMF entity receives the QoS parameter, this embodiment of this application provides a plurality of possible implementations, which are described below by using examples.

First manner: Based on the first manner shown in step 201 in FIG. 2, there are two possible implementations in which the AMF entity stores the QoS parameter.

Manner 1: When the AMF entity receives N2 interface information sent by the PCF entity, the AMF entity stores the N2 interface information.

The N2 interface information includes the QoS parameter. For a specific implementation process of Manner 1, refer to detailed descriptions of an embodiment shown in FIG. 3.

Manner 2: The AMF entity receives N2 interface information and indication information that are sent by the PCF entity, where the N2 interface information includes the QoS parameter.

The indication information may be used to indicate the AMF entity to store the N2 interface information.

Figure 4:
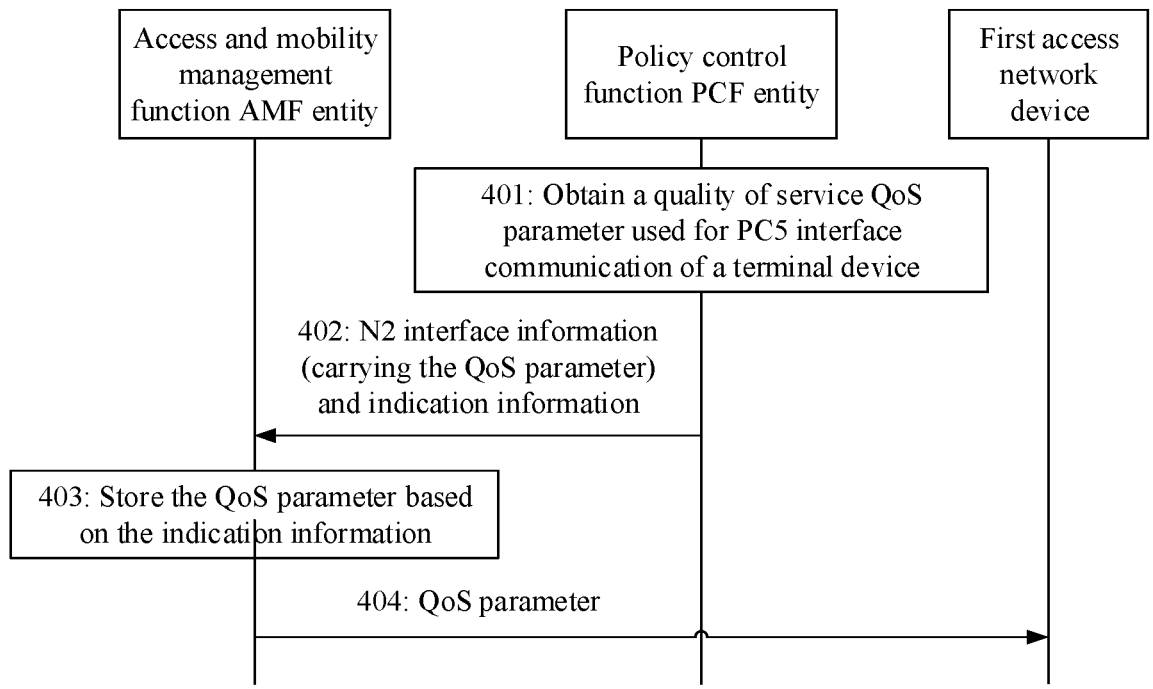
FIG. 4 is a schematic diagram of another embodiment of a data processing method according to an embodiment of this application.

For a specific implementation process of Manner 2, refer to detailed descriptions of an embodiment shown in FIG. 4.

Second manner: Based on the second manner shown in step 201 in FIG. 2, when the AMF entity receives the QoS parameter sent by a second access network device, the AMF entity stores the QoS parameter.

The QoS parameter is used for PC5 interface communication of the terminal device, the second access network device is an access network device to which the terminal device is currently connected, or an access network device that serves the terminal device before the access network device to which the terminal device is currently connected serves the terminal device. For a specific implementation process, refer to detailed descriptions of an embodiment shown in FIG. 5.

Figure 3:
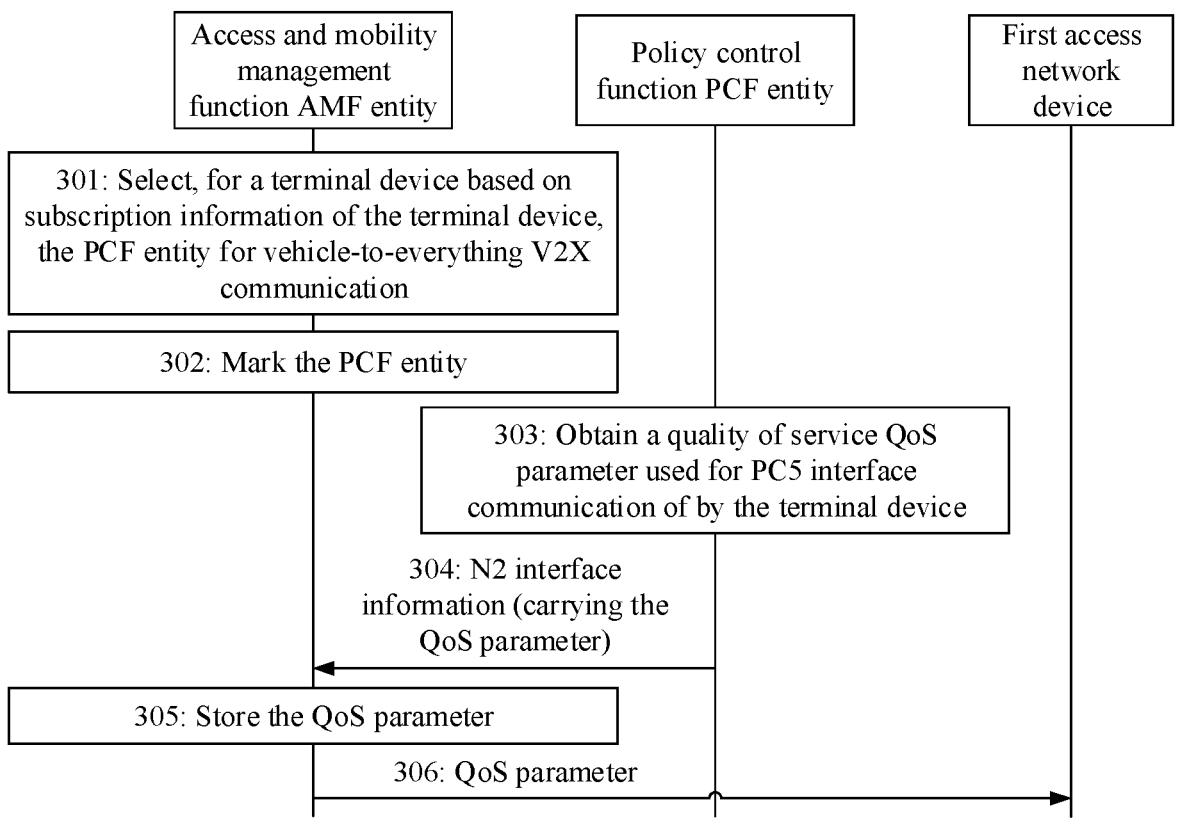
FIG. 3 is a schematic diagram of another embodiment of a data processing method according to an embodiment of this application.

FIG. 3 is a schematic diagram of a data processing method according to an embodiment of this application. The method includes the following steps.

301: An AMF entity selects, for a terminal device based on subscription information of the terminal device, a PCF entity for V2X communication.

For example, the terminal device sends a registration request message to the AMF entity, where the registration request message carries an identifier of the terminal device and a V2X capability of the terminal device. The identifier of the terminal device may be a subscription concealed identifier (SUCI), a subscription permanent identifier (SUPI), or a 5G globally unique temporary identifier (5G GUTI). The AMF entity obtains the subscription information of the terminal device based on the identifier of the terminal device that is carried in the registration request message. The AMF entity performs V2X authorization on the terminal device based on the subscription information of the terminal device and/or the V2X capability of the terminal device that is carried in the registration request message, where the V2X authorization means whether the terminal device is allowed to perform a V2X communication service. Then the AMF entity selects, for the terminal device, a PCF entity for V2X communication. The PCF entity is configured to deliver a QoS parameter to an access network device, and the QoS parameter is used for PC5 interface communication between terminal devices.

It should be noted that after the AMF entity determines that the terminal device supports V2X communication, that the AMF entity selects, for the terminal device, a PCF entity for V2X communication may be specifically that the AMF entity sends a request message to a network repository function (NRF) entity, where the request message requests a PCF entity that is used for V2X communication and that serves the terminal device. Then the NRF entity returns a request response message to the AMF entity, where the request response message carries information about a plurality of candidate PCF entities used for V2X communication. The AMF entity selects, for the terminal device from the plurality of candidate PCF entities used for V2X communication, one PCF entity for V2X communication. Optionally, the AMF entity selects, from the plurality of candidate PCF entities, a PCF entity with minimum current load, as the PCF entity of the terminal device.

302: The AMF entity marks the PCF entity.

The AMF entity marks the PCF entity, so that when the AMF entity receives N2 interface information sent by the PCF entity, the AMF entity may store the N2 interface information.

For example, when the AMF entity receives the QoS parameter sent by the PCF entity, the AMF entity determines whether a preset condition is satisfied; and when the preset condition is satisfied, the AMF entity sends the QoS parameter to an access network device to which the terminal device requests to connect or a target access network device to which the terminal device requests to be handed over.

For example, the AMF entity sets a 1-bit flag for the selected PCF entity for V2X communication, where "1" represents that the N2 interface information from the PCF entity is to be stored, that is, step 305 is performed, and "0" indicates that the N2 interface information from the PCF entity is not stored. When the AMF entity receives the QoS parameter sent by the PCF entity, the AMF entity determines that a value of the flag is "1", and the AMF entity stores the QoS parameter, and when the preset condition is satisfied, the AMF entity sends the QoS parameter to the access network device to which the terminal device requests to connect or the target access network device to which the terminal device requests to be handed over.

Step 302 is an optional step, and the AMF entity may not perform step 302, that is, may directly perform step 303.

303: The PCF entity obtains the QoS parameter used for PC5 interface communication of the terminal device.

Optionally, the PCF entity stores the QoS parameter used for PC5 interface communication of the terminal device; the PCF entity obtains, from a UDR network element, the QoS parameter used for PC5 interface communication of the terminal device; or the PCF entity generates, based on information provided by an application server, the QoS parameter used for PC5 interface communication of the terminal device.

304: The PCF entity sends the N2 interface information to the AMF entity.

The N2 interface information carries the QoS parameter used for PC5 interface communication of the terminal device.

For example, the AMF entity sets up an N11 interface connection to the PCF entity for the terminal device; and then the PCF entity sends the N2 interface information to the AMF entity, where the N2 interface information carries the QoS parameter used for PC5 interface communication of the terminal device.

305: The AMF entity stores the N2 interface information.

The N2 interface information includes the QoS parameter used for PC5 interface communication of the terminal device.

Optionally, after the AMF entity receives the N2 interface information sent by the PCF entity, the AMF entity determines that the value of the flag is "1", and the AMF entity stores the N2 interface information.

306: When the preset condition is satisfied, the AMF entity sends the QoS parameter to a first access network device.

For the preset condition, refer to related descriptions in the embodiment shown in FIG. 2. Details are not described again.

Optionally, the AMF entity sends, to the first access network device, the N2 interface information stored in step 305, where the N2 interface information includes the QoS parameter.

In this embodiment of this application, the AMF entity receives the QoS parameter from the PCF entity for V2X communication, where the QoS parameter is notified to an access network device, and the QoS parameter is used for PC5 interface communication of the terminal device; and then the AMF entity stores the QoS parameter. When the preset condition is satisfied, the AMF entity sends the QoS parameter to the first access network device. Therefore, when the terminal device is in an idle state and requests to establish a connection to the first access network device, or when the terminal device is in a connected state and requests to be handed over from a current access network device to the first access network device, the AMF entity does not need to request the QoS parameter from the PCF entity again. Instead, the AMF entity delivers the QoS parameter stored by the AMF entity to the first access network device. In this way, an operation procedure is simplified and signaling overheads are reduced.

FIG. 4 is a schematic diagram of a data processing method according to an embodiment of this application. The method includes the following steps.

401: A PCF entity obtains a QoS parameter used for PC5 interface communication of a terminal device.

Step 401 is similar to step 303 in FIG. 3. Details are not described herein again.

402: An AMF entity receives N2 interface information and indication information that are sent by the PCF entity.

The N2 interface information and the indication information are two independent pieces of information. The two pieces of information may be carried in a same message, or may be sent by using different messages. This is not limited.

The PCF entity may be a PCF entity for V2X communication.

Correspondingly, the foregoing method may further include: The AMF entity selects, for the terminal device based on subscription information of the terminal device, the PCF entity for V2X communication.

For example, the AMF entity sets up an N11 interface connection to the PCF entity for the terminal device; and the PCF entity sends the N2 interface information and the indication information to the AMF entity.

The N2 interface information carries the QoS parameter, and the QoS parameter may be used by an access network device to determine the QoS parameter used for PC5 interface communication of the terminal device.

The indication information indicates the AMF entity to store the N2 interface information, or the indication information indicates the AMF entity to store the QoS parameter.

Optionally, the indication information is further used to indicate the AMF entity to send the QoS parameter to a target access network device of the terminal device when a preset condition is satisfied.

The target access network device may be an access network device to which the terminal device requests to connect or be handed over.

403: The AMF entity stores the QoS parameter based on the indication information.

For example, the AMF entity parses the indication information, and then stores the QoS parameter.

404: When the preset condition is satisfied, the AMF entity sends the QoS parameter to a first access network device.

Optionally, when the AMF entity receives the N2 interface information and the indication information that are sent by the PCF entity, the AMF entity stores the N2 interface information based on the indication information. Then the AMF entity determines whether the preset condition is satisfied. When the preset condition is satisfied, the AMF entity sends the N2 interface information to the first access network device, where the N2 interface information includes the QoS parameter. Step 404 is similar to step 203 in FIG. 2. For details, refer to detailed descriptions of step 203 in FIG. 2. Details are not described herein again.

In this embodiment of this application, the AMF entity receives the N2 interface information and the indication information from the PCF entity for V2X communication, where the N2 interface information carries the QoS parameter used for PC5 interface communication of the terminal device, the QoS parameter is notified to the access network device, and the QoS parameter is used for PC5 interface communication of the terminal device, and the indication information indicates the AMF entity to store the N2 interface information, or the indication information indicates the AMF entity to store the QoS parameter. Then the AMF entity stores the N2 interface information based on the indication information, that is, stores the QoS parameter. When the preset condition is satisfied, the AMF entity sends the QoS parameter to the first access network device. Therefore, when the terminal device is in an idle state and requests to establish a connection to the first access network device, or when the terminal device is in a connected state and requests to be handed over from a current access network device to the first access network device, the AMF entity does not need to request the QoS parameter from the PCF entity again. Instead, the AMF entity delivers the QoS parameter stored by the AMF entity to the first access network device. In this way, an operation procedure is simplified and signaling overheads are reduced.

This application further provides an embodiment. An implementation process of this embodiment is similar to that of the embodiment shown in FIG. 4, and a difference lies in steps 402 and 403. Step 402 may be replaced by: The PCF entity sends N2 interface information to the AMF entity, where the N2 interface information includes the QoS parameter used for PC5 interface communication of the terminal device and indication information, and the indication information indicates the AMF entity to store the N2 interface information. Step 403 may be replaced by: The AMF entity stores the QoS parameter based on the indication information in the N2 interface information. The indication information may be a field in a packet header of the N2 interface information, and the field indicates the AMF entity to store the QoS parameter. Alternatively, the indication information is a message type of the N2 interface information, for example, the message type is a V2X type, a QoS type, or a V2X QoS type.

Figure 5:
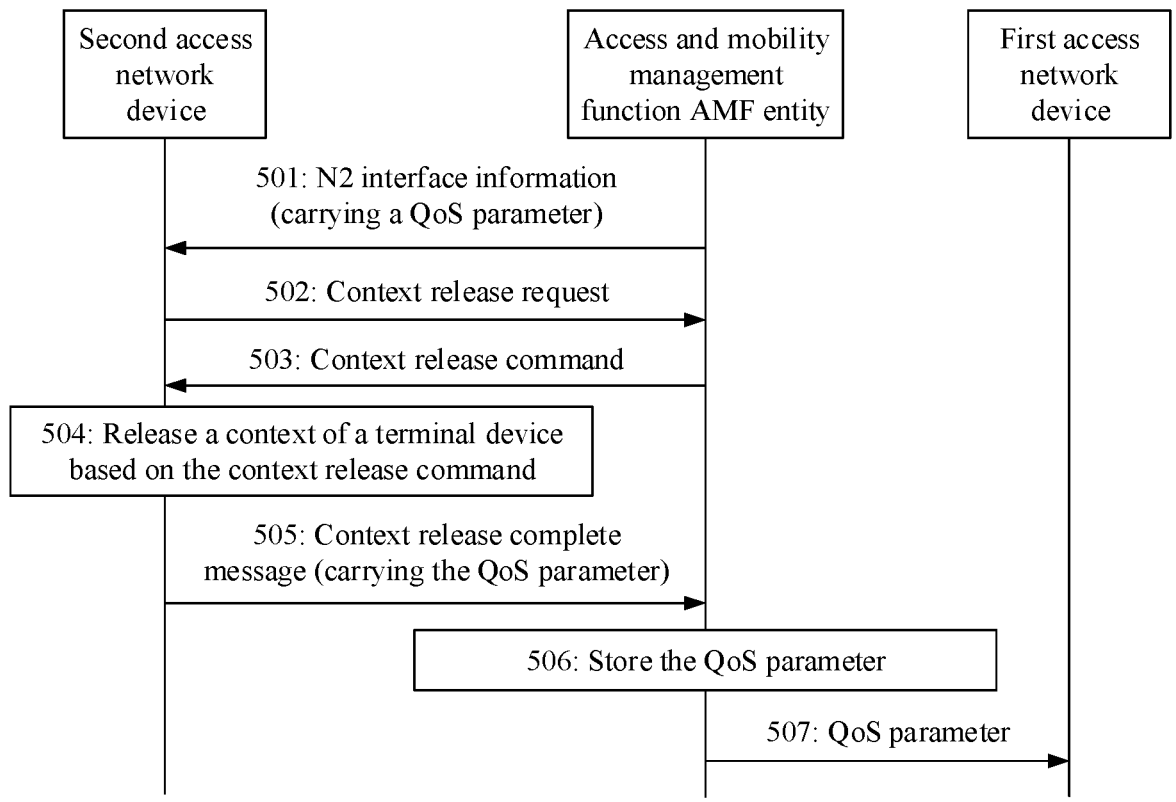
FIG. 5 is a schematic diagram of another embodiment of a data processing method according to an embodiment of this application.

FIG. 5 is a schematic diagram of a data processing method according to an embodiment of this application. The second access network device may be a first access network device, or may be an access network device that serves the terminal device before the first access network device serves the terminal device. For example, when the terminal device is handed over from the second access network device to the first access network device, the second access network device is an access network device that serves the terminal device before the first access network device serves the terminal device. When the terminal device requests a connection to the first access network device, and the second access network device that serves the terminal device before the first access network device serves the terminal device is also the first access network device, the first access network device and the second access network device are a same access network device. Referring to FIG. 5, the method includes the following steps.

501: An AMF entity sends N2 interface information to the second access network device.

The N2 interface information carries a QoS parameter used for PC5 interface communication of the terminal device.

For example, after the terminal device sets up a connection to a network in which the second access network device is located, the AMF entity sets up an N11 interface connection to a PCF entity for the terminal device, and the PCF entity sends the N2 interface information to the second access network device through the AMF entity.

502: The second access network device sends a context release request to the AMF entity.

The context release request requests to release a context of the terminal device.

For example, the second access network device triggers release of the context of the terminal device, that is, the second access network device sends the context release request to the AMF entity. That the second access network device triggers release of the context of the terminal device may be that the second access network device does not find, within preset timer duration, that the terminal device exchanges data with the network, or the second access network device determines that a radio link fails to be established between the terminal device and the second access network device, and so on.

It should be noted that release of the context of the terminal device may alternatively be that the AMF entity actively initiates a trigger operation. This is not specifically limited in this application. If the AMF entity actively initiates the trigger operation, the AMF entity does not perform step 502, but directly performs step 503.

503: The AMF entity sends a context release command to the second access network device.

For example, after the AMF entity receives the context release request, the AMF entity sends the context release command to the second access network device.

The context release command indicates the second access network device to release the context of the terminal device.

504: The second access network device releases the context of the terminal device based on the context release command.

For example, the second access network device deletes the context of the terminal device that is stored by the second access network device. If the second access network device still has an RRC signaling connection to the terminal device when receiving the context release command, the second access network device releases the RRC signaling connection to the terminal device, that is, the second access network device sends an RRC connection release message to the terminal device.

505: The second access network device sends a context release complete message to the AMF entity.

For example, after completing release of the context of the terminal device, the second access network device sends the context release complete message to the AMF entity, where the context release complete message carries the QoS parameter used for PC5 interface communication of the terminal device.

506: The AMF entity stores the QoS parameter.

For example, when the AMF entity receives the context release complete message sent by the second access network device, the AMF entity stores the QoS parameter in the context release complete message, that is, stores the QoS parameter.

507: When a preset condition is satisfied, the AMF entity sends the QoS parameter to the first access network device.

Step 507 is similar to step 203 in FIG. 2. For details, refer to detailed descriptions of step 203 in FIG. 2. Details are not described herein again.

In this embodiment of this application, the AMF entity receives the N2 interface information from the second access network device, where the N2 interface information carries the QoS parameter used for PC5 interface communication of the terminal device; and then the AMF entity stores the N2 interface information, that is, stores the QoS parameter. When the preset condition is satisfied, the AMF entity sends the QoS parameter to the first access network device. Therefore, when the terminal device is in an idle state and requests to establish a connection to the first access network device, or when the terminal device is in a connected state and requests to be handed over from a current access network device to the first access network device, the AMF entity does not need to request the QoS parameter from the PCF entity again. Instead, the AMF entity delivers the QoS parameter stored by the AMF entity to the first access network device. In this way, an operation procedure is simplified and signaling overheads are reduced.

FIG. 5 merely shows an embodiment in which in a process of releasing the terminal device from the second access network device, the terminal device sends the QoS parameter to the AMF entity by using the release complete message sent by the second access network device to the AMF entity, and then the AMF entity stores the QoS parameter. This application further provides an embodiment. A specific implementation process of this embodiment is similar to that of the embodiment shown in FIG. 5, and a difference lies in the following:

Step 501*a* is added between step 501 and step 502: The second access network device sends a QoS parameter to the AMF entity, where the QoS parameter is used for PC5 interface communication between terminal devices. For example, the second access network device sends signaling to the AMF entity, where the signaling includes the QoS parameter, so that the AMF entity stores the QoS parameter.

Step 505 may be replaced by 505*a*: The second access network device sends a context release complete message to the AMF entity, where the context release complete message does not carry the QoS parameter.

Step 506 may be replaced by 506*a*: The AMF entity stores the QoS parameter sent by the second access network device.

It should be noted that there is no fixed execution sequence among step 506*a*, step 502 to step 504, in FIG. 5 and step 505*a*. The alternative step 506*a* may be performed first, or steps 502*a* to 504 and step 505*a* may be performed first. Alternatively, step 506*a*, step 502 to step 504, and step 505*a* are performed at the same time based on a situation. This is not specifically limited in this application.

Figure 6:
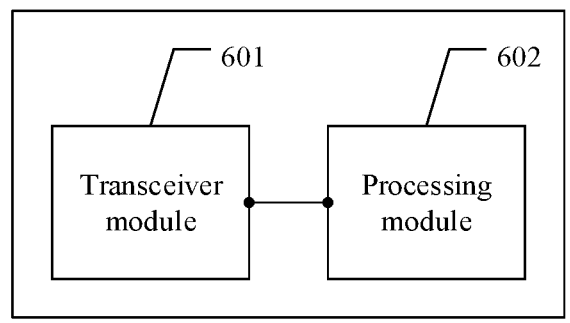
FIG. 6 is a schematic structural diagram of a data processing apparatus according to an embodiment of this application.

The following describes a data processing apparatus provided in the embodiments of this application. FIG. 6 shows an embodiment of the data processing apparatus in the embodiments of this application. The data processing apparatus may be an AMF entity, or a chip or a chip system located on the AMF entity. The data processing apparatus may be configured to perform steps performed by the AMF entity in the embodiments shown in FIG. 2, FIG. 3, FIG. 4, and FIG. 5. For details, refer to related descriptions in the foregoing method embodiments.

The data processing apparatus includes a transceiver module 601 and a processing module 602.

The transceiver module 601 is configured to receive a QoS parameter used for PC5 interface communication of a terminal device.

The processing module 602 is configured to store the QoS parameter.

The transceiver module 601 is configured to: when a preset condition is satisfied, send the stored QoS parameter to a first access network device.

In a possible implementation, the preset condition includes:

the terminal device is in an idle state, and the transceiver module 601 receives an N2 interface signaling connection setup request from the first access network device, where the N2 interface signaling connection setup request requests to establish an N2 interface signaling connection for the terminal device.

In another possible implementation, the first access network device is a target access network device of the terminal device; and the preset condition includes:

the terminal device is in a connected state, and the transceiver module 601 receives a handover request message of the terminal device from a source access network device, where the handover request message requests to hand over the terminal device from the source access network device to the target access network device;

the terminal device is in a connected state, and the transceiver module 601 receives a path switch request from the target access network device, where the path switch request requests to hand over the terminal device from a source access network device to the target access network device, or the path switch request requests to switch an N2 signaling connection and an N3 data plane path of the terminal device from a source access network device to the target access network device; or the terminal device is in a connected state, and the terminal device is successfully handed over from a source access network device of the terminal device to the target access network device.

In another possible implementation, the transceiver module 601 is specifically configured to:

receive N2 interface information from a PCF entity for V2X communication, where the N2 interface information includes the QoS parameter.

The processing module 602 is specifically configured to: when the transceiver module 601 determines that the N2 interface information is from the PCF entity for V2X communication, store the N2 interface information.

In another possible implementation, the processing module 602 is further configured to:

select, for the terminal device based on subscription information of the terminal device, the PCF entity for vehicle-to-everything V2X communication.

In another possible implementation, the transceiver module 601 is specifically configured to:

receive N2 interface information and indication information from a PCF entity, where the N2 interface information includes the QoS parameter, and the indication information indicates the AMF entity to store the N2 interface information, or the indication information indicates the AMF entity to store the QoS parameter.

The processing module 602 is specifically configured to: store the QoS parameter based on the indication information.

In another possible implementation, the transceiver module 601 is specifically configured to:

receive N2 interface information from a PCF entity, where the N2 interface information includes the QoS parameter and indication information used to indicate the data processing apparatus to store the N2 interface information, or the indication information indicates the data processing apparatus to store the QoS parameter.

The processing module 602 is specifically configured to: store the QoS parameter based on the indication information.

In another possible implementation, the transceiver module 601 is specifically configured to:

receive the QoS parameter from a second access network device.

The second access network device is the first access network device, or an access network device that serves the terminal device before the first access network device serves the terminal device, and the QoS parameter is the QoS parameter in the N2 interface information received by the second access network device from the PCF entity.

In another possible implementation, the transceiver module 601 is further configured to:

send a context release command to the second access network device.

The transceiver module 601 is specifically configured to: receive a context release complete message from the second access network device, where the context release complete message carries the QoS parameter.

In another possible implementation, the indication information is further used to indicate the AMF entity to send, when the preset condition is satisfied, the QoS parameter to an access network device to which the terminal device requests to connect or the target access network device to which the terminal device requests to be handed over.

In this embodiment of this application, the transceiver module 601 receives the QoS parameter used for PC5 interface communication of the terminal device; and then the processing module 602 stores the QoS parameter. When the preset condition is satisfied the transceiver module 601 sends the QoS parameter to the first access network device. Therefore, when the terminal device is in the idle state and requests to establish a connection to the first access network device, or when the terminal device is in the connected state and requests to be handed over from a current access network device to the first access network device, the processing module 602 does not need to request the QoS parameter from the PCF entity again. Instead, the transceiver module 601 delivers the stored QoS parameter to the access network device to which the terminal device requests to connect or be handed over. In this way, an operation procedure is simplified and signaling overheads are reduced.

Figure 7:
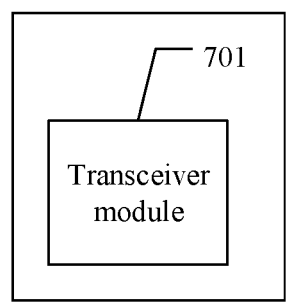
FIG. 7 is another schematic structural diagram of a data processing apparatus according to an embodiment of this application.

The following describes a data processing apparatus provided in the embodiments of this application. FIG. 7 shows an embodiment of the data processing apparatus in the embodiments of this application. The data processing apparatus may be a PCF entity, or a chip or a chip system located on the PCF entity. The data processing apparatus may be configured to perform steps performed by the PCF entity in the embodiments shown in FIG. 3 and FIG. 4. For details, refer to related descriptions in the foregoing method embodiments.

The data processing apparatus includes a transceiver module 701.

The transceiver module 701 is configured to obtain a QoS parameter used for PC5 interface communication of a terminal device.

The transceiver module 701 is configured to send N2 interface information and indication information to an AMF entity, where the N2 interface information includes the QoS parameter, and the indication information indicates the AMF entity to store the QoS parameter, or the indication information indicates the AMF entity to store the N2 interface information.

In this embodiment, the transceiver module 701 sends the N2 interface information and the indication information to the AMF entity, where the N2 interface information includes the QoS parameter. The indication information indicates the AMF entity to store the N2 interface information, so that the AMF entity stores the QoS parameter.

In another possible implementation, the indication information is further used to indicate the AMF entity to send, when a preset condition is satisfied, the QoS parameter to an access network device to which the terminal device requests to connect or a target access network device to which the terminal device requests to be handed over.

The embodiments of this application further provide another data processing apparatus. In an embodiment of the data processing apparatus in the embodiments of this application, the data processing apparatus may be a PCF entity, or a chip or a chip system located on the PCF entity. The data processing apparatus may be configured to perform steps performed by the PCF entity in the embodiments shown in FIG. 3 and FIG. 4. For details, refer to related descriptions in the foregoing method embodiments.

The data processing apparatus includes a transceiver module 701.

The transceiver module 701 is configured to obtain a QoS parameter used for PC5 interface communication of a terminal device.

The transceiver module 701 is configured to send N2 interface information to an AMF entity, where the N2 interface information includes the QoS parameter and indication information for indicating the AMF entity to store the N2 interface information.

In this embodiment, the transceiver module 701 sends the N2 interface information to the AMF entity, where the N2 interface information includes the QoS parameter, and the N2 interface information includes the indication information for indicating the AMF entity to store the N2 interface information, or the indication information indicates the AMF entity to store the QoS parameter. In this embodiment of this application, the indication information carried in the N2 interface information indicates the AMF entity to store the N2 interface information, so that the AMF entity stores the QoS parameter.

In another possible implementation, the indication information is further used to indicate the AMF entity to send, when a preset condition is satisfied, the QoS parameter to an access network device to which the terminal device requests to connect or a target access network device to which the terminal device requests to be handed over.

The following describes a data processing apparatus provided in the embodiments of this application. In an embodiment of the data processing apparatus in the embodiments of this application, the data processing apparatus may be an access network device, or a chip or a chip system located on the access network device. The data processing apparatus may be configured to perform steps performed by the first access network device in the embodiment shown in FIG. 5. For details, refer to related descriptions in the foregoing method embodiments.

The data processing apparatus includes a transceiver module 801. Optionally, the data processing apparatus further includes a processing module 802.

The transceiver module 801 is configured to receive N2 interface information from a PCF entity, where the N2 interface information includes a QoS parameter used for PC5 interface communication of a terminal device.

The transceiver module 801 is configured to send the QoS parameter to an AMF entity.

In this embodiment, the transceiver module 801 sends the QoS parameter to the AMF entity. When the AMF entity receives the QoS parameter sent by the transceiver module 801, the AMF entity stores the QoS parameter, thereby implementing storage of the QoS parameter.

In a possible implementation, the transceiver module 801 is further configured to:
receive a context release command from the AMF entity.
The data processing apparatus further includes the processing module 802. The processing module 802 is configured to:
release a context of the terminal device based on the context release command.
The transceiver module 801 is specifically configured to:
send a context release complete message to the AMF entity, where the context release complete message carries the QoS parameter, and the context release complete message is used by the AMF entity to store the QoS parameter.

Figure 9:
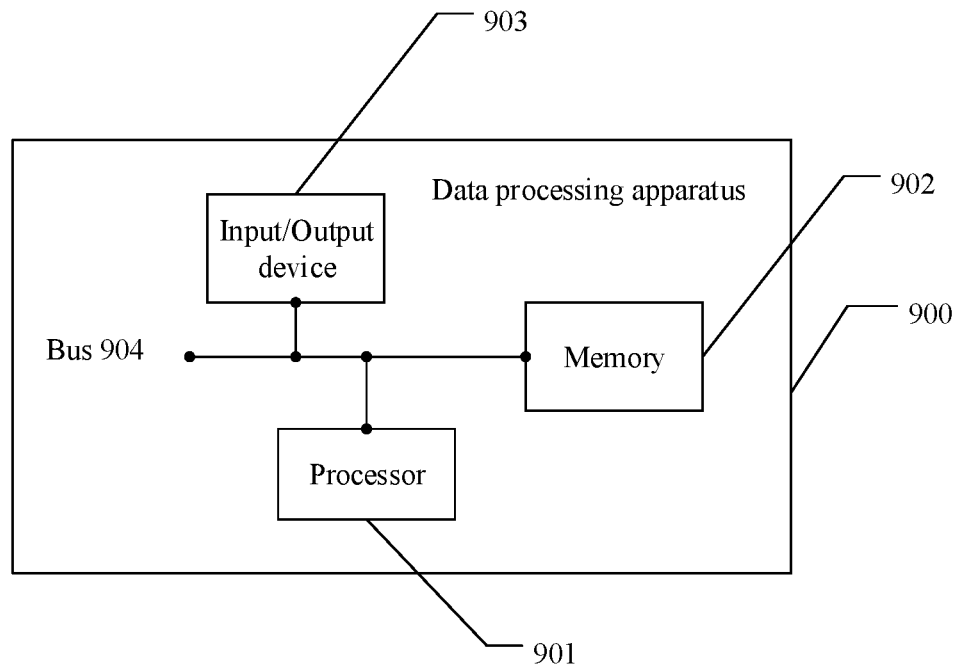
FIG. 9 is another schematic structural diagram of a data processing apparatus according to an embodiment of this application.

This application further provides a data processing apparatus 900. FIG. 9 shows an embodiment of the data processing apparatus in the embodiments of this application. The data processing apparatus may be an AMF entity, or a chip or a chip system located on the AMF entity. The data processing apparatus may be configured to perform steps performed by the AMF entity in the embodiments shown in FIG. 2, FIG. 3, FIG. 4, and FIG. 5. For details, refer to related descriptions in the foregoing method embodiments.

The data processing apparatus 900 includes a processor 901, a memory 902, an input/output device 903, and a bus 904.

In a possible implementation, the processor 901, the memory 902, and the input/output device 903 are separately connected to the bus 904, and the memory stores computer instructions.

The processing module 602 in the foregoing embodiment may be specifically the processor 901 in this embodiment. Therefore, a specific implementation of the processor 901 is not described again. The transceiver module 601 in the foregoing embodiment may be specifically the input/output device 903 in this embodiment.

Figure 10:
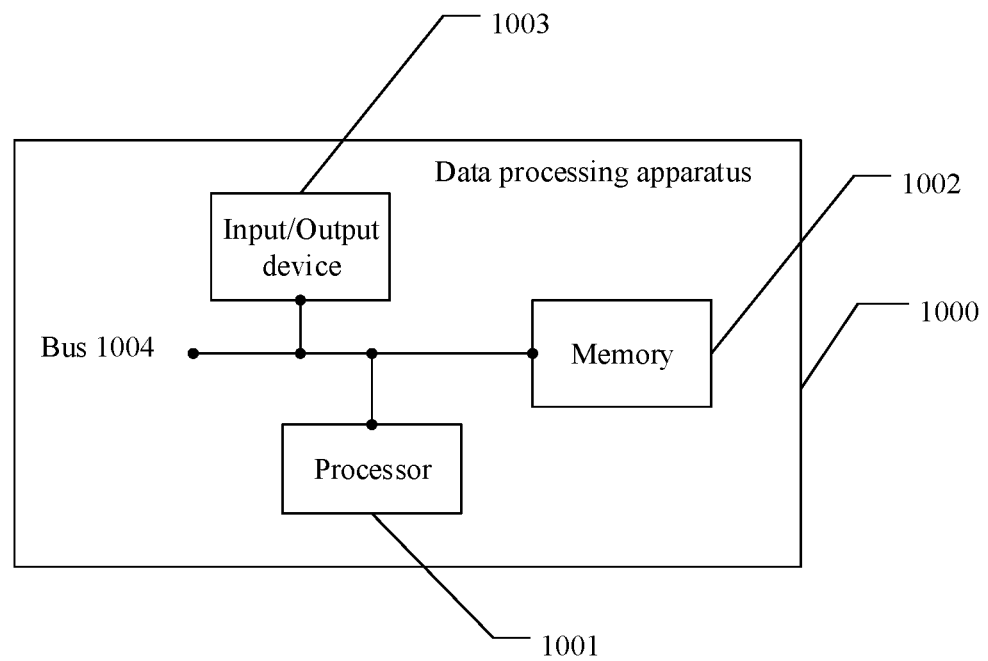
FIG. 10 is another schematic structural diagram of a data processing apparatus according to an embodiment of this application.

This application further provides a data processing apparatus 1000. FIG. 10 shows an embodiment of the data processing apparatus in the embodiments of this application. The data processing apparatus may be a PCF entity, or a chip or a chip system located on the PCF entity. The data processing apparatus may be configured to perform steps performed by the PCF entity in the embodiments shown in FIG. 3 and FIG. 4. For details, refer to related descriptions in the foregoing method embodiments.

The data processing apparatus 1000 includes a processor 1001, a memory 1002, an input/output device 1003, and a bus 1004.

In a possible implementation, the processor 1001, the memory 1002, and the input/output device 1003 are separately connected to the bus 1004, and the memory stores computer instructions.

The transceiver module 701 in the foregoing embodiments may be specifically the input/output device 1003 in this embodiment. Therefore, a specific implementation of the input/output device 1003 is not described again.

Figure 11:
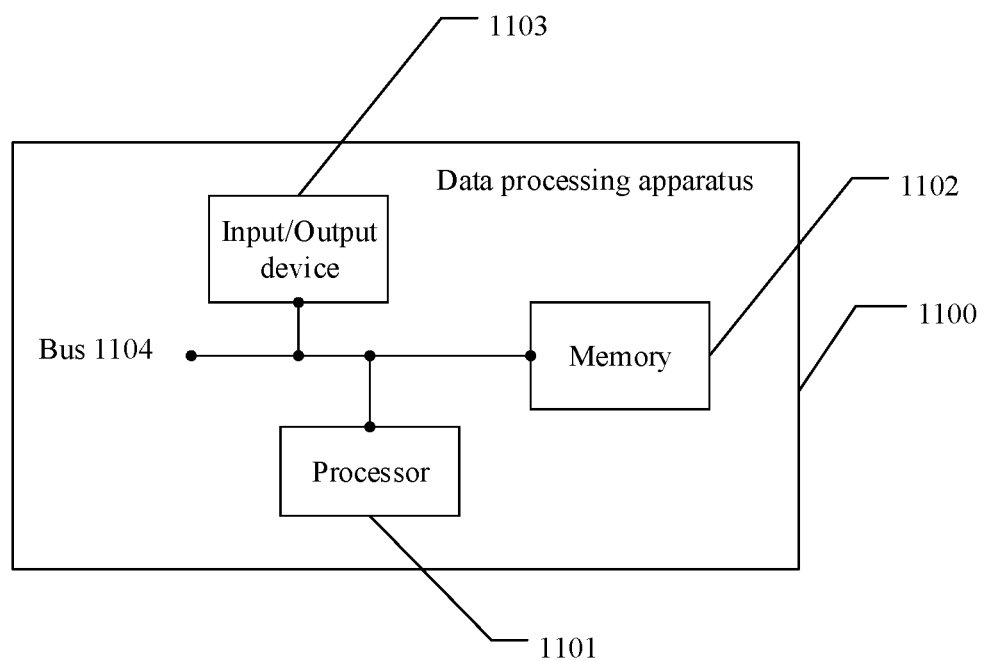
FIG. 11 is another schematic structural diagram of a data processing apparatus according to an embodiment of this application.

This application further provides a data processing apparatus 1100. FIG. 11 shows an embodiment of the data processing apparatus in the embodiments of this application. The data processing apparatus may be an access network device, or a chip or a chip system located on the access network device. The data processing apparatus may be configured to perform steps performed by the first access network device in the embodiment shown in FIG. 5. For details, refer to related descriptions in the foregoing method embodiments.

The data processing apparatus 1100 includes a processor 1101, a memory 1102, an input/output device 1103, and a bus 1104.

In a possible implementation, the processor 1101, the memory 1102, and the input/output device 1103 are separately connected to the bus 1104, and the memory stores computer instructions.

The processing module 802 in the foregoing embodiment may be specifically the processor 1101 in this embodiment. Therefore, a specific implementation of the processor 1101 is not described again. The transceiver module 801 in the foregoing embodiment may be specifically the input/output device 1103 in this embodiment.

Figure 8:
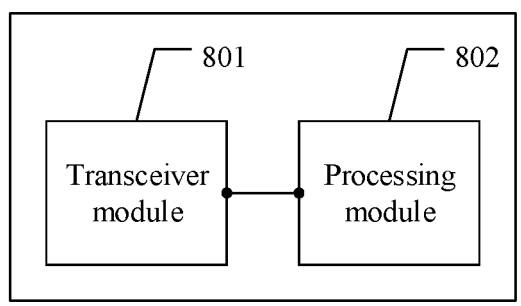
FIG. 8 is another schematic structural diagram of a data processing apparatus according to an embodiment of this application.
Figure 12:
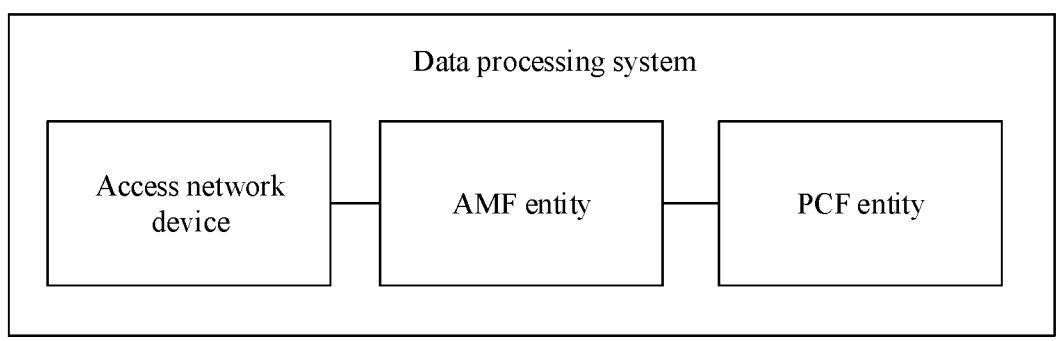
FIG. 12 is a schematic diagram of a data processing system according to an embodiment of this application.

Referring to FIG. 12, an embodiment of this application further provides a data processing system. The data processing system includes a data processing apparatus. Specifically, the data processing apparatus may include the PCF entity shown in FIG. 6, the PCF entity shown in FIG. 7, and the access network device shown in FIG. 8. The AMF entity may be configured to perform all or some of steps performed by the AMF entity in the embodiments shown in FIG. 2, FIG. 3, FIG. 4, and FIG. 5, the PCF entity may be configured to perform all or some of steps performed by the PCF entity in the embodiments shown in FIG. 3 and FIG. 4, and the access network device may be configured to perform all or some of steps performed by the first access network device in the embodiment shown in FIG. 5.

It may be clearly understood by persons skilled in the art that, for the purpose of convenient and brief description, for detailed working processes of the foregoing system, apparatus, and unit, refer to corresponding processes in the foregoing method embodiments. Details are not described herein again.

In another possible design, when the AMF entity, the PCF entity, or the access network device is a chip in a terminal, the chip includes a processing unit and a communications unit. The processing unit may be, for example, a processor. The communications unit may be, for example, an input/output interface, a pin, or a circuit. The processing unit may execute computer-executable instructions stored in a storage unit, to enable the chip in the terminal to perform the data processing method according to any one of the first aspect, the second aspect, the third aspect, or the fourth aspect. Optionally, the storage unit is a storage unit in the chip, for example, a register or a buffer. Alternatively, the storage unit may be a storage unit in the terminal but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the data processing method in the first aspect.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state disk (SSD)), or the like.

In the several embodiments provided in this application, it should be understood that the disclosed system, apparatus, and method may be implemented in another manner. For example, the apparatus embodiments described above are only examples. For example, division into the units is only logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. These modifications or replacements do not cause the essence of the corresponding technical solutions to depart from the spirit and the scope of the technical solutions of the embodiments of this application.

What is claimed is:

1. A data processing method, carried out by an access and mobility management function entity, wherein the method comprises:
   receiving, from a policy control function entity, N2 interface information that comprises:
      indication information indicating the N2 interface information is to be transferred for a vehicle-to-everything (V2X) communication, and
      a ProSe communication 5 (PC5) quality of service (QoS) parameter of a terminal device used for the V2X communication;
   storing, based on the indication information, the QoS parameter; and
   sending, in accordance with a preset condition being satisfied, the QoS parameter to a first access network device.

2. The method according to claim 1, wherein the preset condition comprises the terminal device being in an idle state and the access and mobility management function entity receives an N2 interface signaling connection setup request from the first access network device, and
   wherein the N2 interface signaling connection setup request requests to establish an N2 interface signaling connection for the terminal device.

3. The method according to claim 1, wherein the first access network device is a target access network device of the terminal device,
   wherein the preset condition comprises the terminal device being in a connected state and the access and mobility management function entity receives a handover request message from a source access network device, and
   wherein the handover request message requests to hand over the terminal device from the source access network device to the target access network device.

4. The method according to claim 1, wherein the first access network device is a target access network device of the terminal device,
   wherein the preset condition comprises the terminal device being in a connected state and the access and mobility management function entity receives a path switch request message from the target access network device, and
   wherein the path switch request message requests to switch an N2 signaling connection and an N3 data plane path of the terminal device from a source access network device to the target access network device.

5. The method according to claim 1, wherein before the receiving, by the access and mobility management function entity, N2 interface information from a policy control function entity for vehicle-to-everything (V2X) communication, the method further comprises:
   selecting, by the access and mobility management function entity for the terminal device based on subscription information of the terminal device, the policy control function entity for V2X communication.

6. A data processing apparatus carrying out functionality of an access and mobility management function entity, the data processing apparatus comprising:
   a non-transitory memory storage comprising instructions; and
   one or more processors in communication with the memory storage, wherein the one or more processors execute the instructions to carry out a data processing method comprising:
      receiving, from a policy control function entity, N2 interface information that comprises:
         indication information indicating the N2 interface information is to be transferred for a vehicle-to-everything (V2X) communication, and
         a ProSe communication 5 (PC5) quality of service (QoS) parameter of a terminal device used for the V2X communication;
      storing, based on the indication information, the QoS parameter; and
      sending, in accordance with a preset condition being satisfied, the QoS parameter to a first access network device.

7. The apparatus according to claim 6, wherein the preset condition comprises the terminal device being in an idle state and the apparatus receives an N2 interface signaling connection setup request from the first access network device, and
   wherein the N2 interface signaling connection setup request requests to establish an N2 interface signaling connection for the terminal device.

8. The apparatus according to claim 6, wherein the first access network device is a target access network device of the terminal device,
   wherein the preset condition comprises the terminal device being in a connected state and the apparatus receives a handover request message from a source access network device, and
   wherein the handover request message requests to hand over the terminal device from the source access network device to the target access network device.

9. The apparatus according to claim 6, wherein the first access network device is a target access network device of the terminal device,
   wherein the preset condition comprises the terminal device being in a connected state and the apparatus receives a path switch request message from the target access network device, and
   wherein the path switch request message requests to switch an N2 signaling connection and an N3 data plane path of the terminal device from a source access network device to the target access network device.

10. The apparatus according to claim 6, wherein before the receiving, from a policy control function entity, N2 interface information for vehicle-to-everything (V2X) communication, the method further comprises:
    selecting, by the apparatus for the terminal device based on subscription information of the terminal device, the PCF entity policy control function entity for V2X communication.

11. A non-transitory computer-readable medium storing computer instructions, that when executed by one or more processors, cause the one or more processors to perform a functionality of an access and mobility management function entity, wherein the method comprises:
    receiving, from a policy control function entity, N2 interface information that comprises:
       indication information indicating the N2 interface information is to be transferred to a vehicle-to-everything (V2X) communication, and a ProSe communication 5 (PC5) quality of service (QoS) parameter of a terminal device used for the V2X communication;

storing, based on the indication information, the QoS parameter; and sending, in accordance with a preset condition being satisfied, the QoS parameter to a first access network device.

12. The non-transitory computer-readable medium according to claim 11, wherein the preset condition comprises the terminal device being in an idle state and the access and mobility management function entity receives an N2 interface signaling connection setup request from the first access network device, and wherein the N2 interface signaling connection setup request requests to establish an N2 interface signaling connection for the terminal device.

13. The non-transitory computer-readable medium according to claim 11, wherein the first access network device is a target access network device of the terminal device, wherein the preset condition comprises the terminal device being in a connected state and the access and mobility management function entity receives a handover request message from a source access network device, and wherein the handover request message requests to hand over the terminal device from the source access network device to the target access network device.

14. The non-transitory computer-readable medium according to claim 11, wherein the first access network device is a target access network device of the terminal device, wherein the preset condition comprises the terminal device being in a connected state and the access and mobility management function entity receives a path switch request message from the target access network device, and wherein the path switch request message requests to switch an N2 signaling connection and an N3 data plane path of the terminal device from a source access network device to the target access network device.

15. The non-transitory computer-readable medium according to claim 11, wherein the computer instructions further cause the one or more processors to perform the step of:

selecting, for the terminal device based on subscription information of the terminal device, the policy control function entity for V2X communication.

16. A data processing system, comprising:

an access and mobility management function entity; and a policy control function entity;

wherein the policy control function entity is configured to send, to the access and mobility management function entity, N2 interface information that comprises:

indication information indicating the N2 interface information is to be transferred for a vehicle-to-everything (V2X) communication, and a ProSe communication 5 (PC5) quality of service (QoS) parameter of a terminal device used for the V2X communication; and wherein the access and mobility management function entity is configured to:

receive the N2 interface information, store the QoS parameter based on the indication information, and send, in accordance with a preset condition being satisfied, the QoS parameter to a first access network device.

17. The system according to claim 16, wherein the preset condition comprises the terminal device being in an idle state and the access and mobility management function entity receives an N2 interface signaling connection setup request from the first access network device, and wherein the N2 interface signaling connection setup request requests to establish an N2 interface signaling connection for the terminal device.

18. The system according to claim 16, wherein the first access network device is a target access network device of the terminal device, wherein the preset condition comprises the terminal device being in a connected state and the access and mobility management function entity receives a handover request message from a source access network device, and wherein the handover request message requests to hand over the terminal device from the source access network device to the target access network device.

19. The system according to claim 16, wherein the first access network device is a target access network device of the terminal device, wherein the preset condition comprises the terminal device being in a connected state and the access and mobility management function entity receives a path switch request message from the target access network device, and wherein the path switch request message requests to switch an N2 signaling connection and an N3 data plane path of the terminal device from a source access network device to the target access network device.

20. The system according to claim 16, wherein the access and mobility management function entity is further configured to:

select, based on subscription information of the terminal device, the policy control function entity for V2X communication.

* * * * *

UNITED STATES PATENT AND TRADEMARK OFFICE
CERTIFICATE OF CORRECTION

PATENT NO. : 12,200,471 B2
APPLICATION NO. : 17/489422
DATED : January 14, 2025
INVENTOR(S) : Ying et al.

Page 1 of 1

It is certified that error appears in the above-identified patent and that said Letters Patent is hereby corrected as shown below:

In the Claims

Claim 10: Column 26, Line 56: "PCF entity policy control function entity for V2X" should read as -- policy control function entity for V2X --.

Signed and Sealed this
Seventeenth Day of June, 2025

Coke Morgan Stewart
*Acting Director of the United States Patent and Trademark Office*